(12) United States Patent
Pepe et al.

(10) Patent No.: US 8,666,849 B2
(45) Date of Patent: Mar. 4, 2014

(54) COMPUTER IMPLEMENTED METHOD FOR BILL ANALYSIS OVER THE INTERNET

(75) Inventors: Thomas F. Pepe, Missouri City, TX (US); Todd M. Dunphy, Missouri City, TX (US); Jeremy Allen Groh, Harrisburg, PA (US)

(73) Assignee: Validas, LLC, Sugar Land, TX (US)

( * ) Notice: Subject to any disclaimer, the term of this patent is extended or adjusted under 35 U.S.C. 154(b) by 580 days.

(21) Appl. No.: 12/931,428

(22) Filed: Feb. 1, 2011

(65) Prior Publication Data

US 2011/0137762 A1 Jun. 9, 2011

Related U.S. Application Data

(63) Continuation-in-part of application No. 11/800,502, filed on May 4, 2007, now Pat. No. 7,904,354.

(51) Int. Cl.
| | |
|---|---|
| G07B 17/00 | (2006.01) |
| G07F 19/00 | (2006.01) |
| H04M 11/00 | (2006.01) |
| G06Q 20/02 | (2012.01) |
| H04W 4/24 | (2009.01) |

(52) U.S. Cl.
CPC *G06Q 20/02* (2013.01); *H04W 4/24* (2013.01)
USPC .............................................. 705/30; 455/406

(58) Field of Classification Search
CPC ................................. G06Q 20/02; H04W 4/24
USPC .............................................. 705/30; 455/406
See application file for complete search history.

(56) References Cited

U.S. PATENT DOCUMENTS

| | | |
|---|---|---|
| 5,027,388 A | 6/1991 | Bradshaw et al. |
| 5,093,787 A | 3/1992 | Simmons |
| 5,659,601 A | 8/1997 | Cheslog |
| 6,070,150 A | 5/2000 | Remington et al. |
| 6,493,685 B1 | 12/2002 | Ensel et al. |
| 6,574,465 B2 | 6/2003 | Marsh et al. |
| 6,681,106 B2 | 1/2004 | Marsh et al. |
| 6,813,488 B2 | 11/2004 | Marsh et al. |
| 6,885,997 B1 | 4/2005 | Roberts |
| 6,968,319 B1 | 11/2005 | Remington et al. |
| 7,072,639 B2 | 7/2006 | Marsh et al. |
| 7,167,699 B1 | 1/2007 | Kretsinger |
| 7,478,066 B2 | 1/2009 | Remington et al. |
| 7,805,342 B2 * | 9/2010 | Fisher .............................. 705/30 |
| 2001/0007978 A1 | 7/2001 | Marsh et al. |
| 2002/0087440 A1 | 7/2002 | Blair et al. |
| 2003/0069845 A1 | 4/2003 | DeWitt et al. |
| 2003/0140306 A1 | 7/2003 | Robinson |
| 2003/0225690 A1 | 12/2003 | Marsh et al. |
| 2004/0019561 A1 | 1/2004 | Eaton |

(Continued)

Primary Examiner — Scott Zare
(74) Attorney, Agent, or Firm — Parks & Associates P.C.

(57) ABSTRACT

A computer software method implemented on a computer for real-time analysis of a company's bill, such as a cell phone bill, by submitting a bill, generated by the billing company in electronic format, over the Internet, using computer loaded published public and current market information for selected billing companies. The computer advises the bill submitter, in real-time, by providing a report for submission to said billing company for correction and adds report to a blind summary in memory of generated reports by type of errors for billing companies from previous analysis for each billing company's collective errors and uses the collective summary for each billing company to enhance and improve future bill analysis on the computer and to provide a summary for each billing company.

18 Claims, 7 Drawing Sheets

(56) References Cited

U.S. PATENT DOCUMENTS

| | | |
|---|---|---|
| 2004/0044602 A1 | 3/2004 | Christine Batur et al. |
| 2004/0058668 A1* | 3/2004 | Russell et al. ............... 455/406 |
| 2004/0067747 A1* | 4/2004 | Carpenter et al. ............ 455/405 |
| 2004/0139016 A1 | 7/2004 | Forzley et al. |
| 2004/0172297 A1 | 9/2004 | Rao et al. |
| 2005/0060261 A1 | 3/2005 | Remington et al. |
| 2005/0065882 A1 | 3/2005 | Remington et al. |
| 2005/0102231 A1 | 5/2005 | Remington et al. |
| 2005/0137910 A1 | 6/2005 | Rao et al. |
| 2005/0216380 A1 | 9/2005 | Morris et al. |
| 2005/0273360 A1 | 12/2005 | Drucker et al. |
| 2006/0059021 A1 | 3/2006 | Yulman et al. |
| 2006/0089907 A1 | 4/2006 | Kohlmaier et al. |
| 2006/0095372 A1 | 5/2006 | Venkatasubramanian et al. |
| 2006/0095373 A1 | 5/2006 | Venkatasubramanian et al. |
| 2006/0173777 A1 | 8/2006 | Torres et al. |
| 2006/0178941 A1 | 8/2006 | Purnell et al. |
| 2008/0247629 A1 | 10/2008 | Gilder et al. |
| 2008/0275774 A1 | 11/2008 | Pepe et al. |
| 2009/0055297 A1* | 2/2009 | Gunderman ................... 705/30 |

* cited by examiner

| Raw Data Columns (10) | Group (11) | Column Description (12) |
|---|---|---|
| ActivationCharges | One Time Costs | Charges incurred for activation of new account, service, or device. |
| BillDate | Bill Info | The carrier's invoice date. |
| DetailedBillingCharges | Miscellaneous Costs | Charges for billing detail. |
| EquipmentAccessoryCharges | Equipment Costs | Charges for equipment purchased. |
| InternationalRoamingDataCharges | International Costs | Total charges for international data roaming. |
| InternationalRoamingDataUsage(MB) | International Data Usage | Total int'l data roaming usage. |
| InternationalRoamingMinutesUsed | International Voice Usage | Total int'l roaming voice minutes used. |
| IsFamilyTrackingAppFree | Plan Configuration | Denotes whether family tracking apps are included for free. |
| OneMinuteCalls | Domestic Voice Usage | Total calls billed as one minute but which lasted less than 60 seconds. |
| PeakLandlineMinutes | Domestic Voice Usage | Number of peak minutes used to call landlines. |
| PictureVideoMessageCharges | Messaging Costs | Charges for picture video message services. |
| RingtoneCharges | Data Costs | Charges for ringtones. |
| TaxesGovSurcharges | Taxes & Surcharges | Total taxes, and gov't surcharges - including USF fees. |
| TotalIncomingMinutesUsed | Domestic Voice Usage | Total incoming voice minutes |
| TotalLandlineMinutesUsed | Domestic Voice Usage | Total minutes used during calls to landlines. |

Fig. 6 —cont'd

COMPUTER IMPLEMENTED METHOD FOR BILL ANALYSIS OVER THE INTERNET

RELATED APPLICATION

This application is a continuation-in-part of application Ser. No. 11/800,502 filed May 4, 2007 now U.S. Pat. No. 7,904,354.

BACKGROUND OF THE INVENTION

1. Field of the Invention

This invention is related to a computer implemented method for real-time automatic analysis of a customer's/bill submitter's bill, such as a cell phone bill, for errors and utilization of services or products from a billing company using computer loaded public and current market information for selected billing companies and providing a report back in real-time to the customer/bill submitter and/or billing company by a third-party computer server providing the corrective action necessary. The third-party computer server may add the corrective action or errors by type of errors for each billing company to a blind summary in the memory of the server computer by type of errors for each billing company from previous analysis for each billing company's collective errors to use the individual collective summary of errors for each billing company to enhance and improve future bill analysis on the server computer and to provide a summary to each billing company of its collective errors over a preselected time.

This invention is achieved by loading public and current market plan information on a third-party server computer and creating individual data fields and patterns from the data of the loaded public and current market information for each company, such as a cell phone company for selected multiple companies on the server computer, and then obtaining a bill in electronic format from the billing company, such as a cell phone company, generated in electronic format by the company sending the bill, for analysis of errors and utilization of the bill on the third-party's computer server against the individual data fields and patterns created from the published public and current market information.

After the bill is submitted, the computer server first determines if the bill submitted is in text readable format and is from a company for which public and current market plan information is stored on the computer. If it is not, the computer advises the bill submitter over the internet of an error and that it cannot proceed forward with the bill analysis. If the bill is in text readable format and is from a company determined to be a company for which public and current market plan information is stored on the computer, then the bill text data is read into the computer as text content and matched against individual data fields and patterns from the public and current market information loaded in the server computer's memories for comparison against the public and current market plan information on the server computer and runs calculations to analyze the bill for errors and utilization of the bill received from the bill submitter relative to the billing company's public and current market plan information to determine if a billing error has occurred. A report is generated on the server computer for the bill submitted and is readied for displayed through the server computer over the Internet to the bill submitter to show any errors in the bill, but first the bill submitter is advised electronically by displaying in real-time an indication that a report is ready and then the server computer allows the bill submitter to enter payment information to pay for the report before being allowed to view the report of analyzed bill for errors and utilization over the Internet.

After reviewing the report of the analyzed bill for errors and utilization, the bill submitter, at bill submitter's election, may elect to forward the analyzed bill showing the results to the billing company, such as a cell phone company, for corrective action on the bill submitter's account or the bill submitter may elect to have third-party's web server computer forward such report to the billing company.

After the report is generated the billing errors are added by category and type of error and utilization for the billing company as a blind summary in memory of generated reports by type of errors for each billing company stored on the computer from previous analysis for each billing company's collective errors for a predetermined time. This collective summary of errors by category and type of errors and utilization stored on the computers may then be used in at least two ways. One way the collective summary of errors for each billing company stored on the server computer is used, is for showing each particular billing company its collective errors and utilization by category for each particular billing company over a predetermined time. Another way the collective summary of errors for each billing company stored on the computer is used, is for adding each particular billing company's collective errors and utilization to the public and current market plan information on the server to update and enhance the accuracy of the public and current market information on said stored information for each billing company to improve analysis and accuracy of future bills submitted by bill submitter's for errors and utilization.

2. Description of Related Art

The present invention may be useful in situations where companies, such as cell phone companies, issue bills to their customers in large volumes based on public rate plans or services. The prior art required a customer/bill submitter to have significant knowledge about how the industry and/or billing company computed their bills using rate plans on which the customer's bill was based. This required the customer/bill submitter to have knowledge and data required to make an analysis of their bills against the public rate plan of the billing company and required a significant amount of time for data collection by the customer/bill submitter before an analysis of the bill could even be undertaken.

The prior art, in some cases, required the customer/bill submitter to provide paper invoices, credit memorandum, and their current plan information before analysis could be commenced. Sometimes the prior art required that, that data to be converted to electronic form by optical character reader to put their data into an electronic form prior to being submitted for analysis and before analysis could be commenced.

Sometimes the prior art required a bill submitter to communicate back and forth with the party doing the analysis to verify all the data was properly received and was complete, before an analysis could be commenced.

In the case of the prior art using third-party companies to do the evaluation and analysis of bills, these third-party companies proceeded to build a baseline template for analysis of the customer's account in historical time and the comparisons were made against various billing companies plans or against the customer's plan but were time delayed because of the complicated analysis and reporting requirements from the customer/bill submitter.

Further, the prior art was not able to utilize just the bill provided by the bill submitter from the billing company to run its analysis for errors and utilization for the analysis for the bill submitter, but required additional input from the customer/bill submitter. Clearly the prior art did not provide for receiving a bill in electronic format generated by the billing company over the Internet from the customer/bill submitter, or retrieving the bill submitter's bill in electronic format generated by the billing company over the Internet by a third-party company from billing company, on which to perform the analysis for billing errors and utilization and that nothing else was required to commence and perform an analysis for billing errors and utilization.

Also the prior art did not provide for a simple interfacing by the customer/bill submitter simply logging on to a third-party's website server computer and submitting either the bill from the billing company in electronic format or providing data to the third-party website server computer which would allow the server computer to obtain the bill for the bill submitter from the billing company in electronic format by accessing billing companies computers.

Yet another problem with prior art was that each customer/bill submitter's bill submission was treated as a one-of-a-kind procedure and there was no collection and correlation of data and information against published public and current market rate plan information even if that data was actually maintained on the server computer for analysis of errors and utilization.

The prior art also failed to use the published public and current market rate plan information by breaking it down into individual data fields and patterns of data on the server computer so each piece could be used in rapid computer analysis for errors and utilization of service by each individual billing company from multiple companies preselected from a group of companies against a bill submitted.

Further the prior art did not teach analyzing a bill received in electronic format via server computer to determine that the electronic format is in text readable form and then reading the contents of said text, for example cell phone bill, to the memory of the server computer to determine which billing company, such as a cell phone company, the bill was from and whether it was a company on which public and current market information had been loaded to the server computer and whether the electronic bill was in a text form which was readable by the server computer. The prior art represented that it could process and analyze errors and utilization for all companies, because it relied upon the bill submitter to provide the company name and data necessary for bill analysis for errors and utilization and therefore it did not need a means of identifying from which company the bill submitter was submitting his/its bill.

The prior art issued transaction identifiers to identify the bill submitter's bill while it was being processed, but the transaction identifier did not serve as a intelligent transaction identifier to identify the dates for which the bill was provided, account number of bill submitter, and/or the billing company for allowing tracking of the bill submitted by all or any combination of the data listed above and therefore did not allow transaction identifier to serve as a intelligent transaction identifier.

Also the prior art did not compare and read into memory the stored text of the bill submitted, under unique intelligent transaction identifier, by comparing the text read into the computer against specific phrase patterns to determine if the stored text match associated data fields and patterns created from the public and current market plan information created for each company from the multiple billing companies loaded in memory.

Further, since the prior art relied on the bill submitter and the billing company's invoice as the primary sources for obtaining data on which to calculate for errors and utilization, and did not automatically run the extracted values and terms, in the case of cell phone companies, through a phone number call lookup database to determine the data concerning each phone number and call as to whether it was a cell phone call, a pay phone call, a landline call and then determine for example only whether the calls were all from the same carrier, different carriers, etc. the cell phone company prior art calculated errors and utilization were highly inaccurate in its error analysis and utilization evaluations.

Also the prior art after computing the errors and utilization of the billing company did not collect summaries from its reports by category and type of error by billing company for all billing companies whose public and current market information were used in the process of analyzing all bills submitted to the server computer and stored there for some predetermined time so that they could generate from said server computer errors and utilization reports for each billing company by billing company for its collective errors and utilization for each of the billing companies for which public and current market information was loaded on the server computers.

Further, since the prior art did not collect a cumulative report of errors and utilization by each individual billing company for all bills analyzed by the server computer, the prior art did not have the cumulative report of errors and utilization to add to the public and current market information analyzed to update and enhance the accuracy of analysis for errors and utilization for future bill analysis. The prior art, thus, did not provide a self teaching computer system for bill analysis and the cumulative report of errors and utilization analysis which improved the computers accuracy in future analysis.

SUMMARY OF THE INVENTION

It is the object of this invention to overcome the deficiencies and shortcomings of the prior art and provide a computer implemented method which provides rapid real-time and simplified bill analysis, such as cell phone bills, to customers/bill submitters whose bills are based on public rate plans and services of mass billing companies. In this invention a customer/bill provider simply logs on to a third-party server computer over the Internet, and the customer/bill submitter does not have to provide anything other than a bill generated by the billing company in electronic format or have any significant knowledge of how the industry and/or billing company compute bills against the rate plan on which the bill is based, to have his bill analyzed.

It is the object of this invention to have public and current market plan information for multiple companies, such as cell phone companies, loaded on a server computer for creating individual data fields and phrase patterns from the loaded public and current plan information by each company, such as cell phone companies, from the multiple companies. The public and current market plan information is loaded on the server computer for being compared against specific data fields and phrase patterns of bills, such as cell phone bills, which are determined to be a bill from one of the companies who has their public and current market plan information loaded, to analysis the bill for errors. This invention requires no additional input from the customer/bill submitter or the billing company.

It is yet a further object of this invention to provide a public webpage over the Internet from the third-party server computer for public login by bill submitters to allow a bill submitter to login to obtain an automatic analysis of his billing company's bill. The public webpage provides a space on the public webpage for entry of identification, and password by the bill submitter and further provides an option to the bill submitter on the public webpage for the bill submitter to either submit his bill for analysis which he has obtained in electronic format from the billing company or the bill submitter provides data through the public webpage to allow the third-party's server computer to log into the billing companies computers to access the bill submitter's bill for obtaining the bill from the billing company and for loading the bill in electronic format on the third-party server computer over the Internet.

It is the further object of this invention that the third-party server computer load the submitter's bill in electronic format on the server computer and analyze the bill in electronic format to determine if it is in a text readable format and to determine if it is a billing company for which public and current market information has been loaded on the server or return an error message to the customer/bill submitter while still logged into the server computer that the server computer cannot perform bill analysis on the submitted bill.

Yet another object of this invention is to have the third-party server computer generate a intelligent transaction identifier for the bill submitted for allowing identification of date of bill submitted, time period covered by the bill, account number of bill submitter, and billing company for tracking of the bill submitted by all or any combination of the data listed in the intelligent transaction identifier.

Also an object of this invention is to extract values and terms of text content from the bill into memory for matching data fields and patterns based on the company loaded individual data fields and patterns in memory and in the case of a company, such as cell phone company, and to extract values and terms for phone numbers on the bill, which are run through a phone number call lookup database for determining data concerning each phone number. For example, the data determined to be used to accurately proceed with the calculation of the correct cell phone bill and usage or utilization is whether the phone number is a cell phone number, a landline phone, a pay phone, and determine whether the calls were all from the same carrier or different carriers etc.

Another object of the invention is comparing calculated charges and usage on a bill submitted against billing company submitted bill for determination of properly billed items and improperly billed items and generating a report by the billing company on the third-party server computer for display through the server computer to the public webpage over the Internet to the bill submitter for corrective action on the bill submitted.

It is also an object of this invention to provide a simple payment procedure for the bill submitter to pay for his billing error and utilization analysis report, at the time he receives the report, in real-time over the website server computer of the third-party.

Another object of the invention is the collection of summaries of billing errors by category and type of error by each billing company for all billing companies whose public and current market information is used in the process of analyzing all bills submitted to the third-party server computer and stored there for some predetermined time, so that the third-party can generate from the third-party server computer errors and utilization reports for each billing company for its collective errors and utilization for the billing companies and generate a report from the third-party server computer on error and utilization for each billing company by each billing company for collective errors and utilization for each of the billing companies loaded on the server computer.

It is a further object of the invention to add the collective summaries generated by category and type of error for each billing company by each billing company which is stored on said server computer to the public and current market information analyzed for each of such billing companies and use the collective summary generated by category and type of errors for each billing company by billing company for improvement of future bill analysis such that the third-party server computer improves it's accuracy for future analysis of submitted bills.

Other objects, features, advantages, and applications of the present invention will become apparent upon reading the following detailed description of the preferred embodiment of the invention when been viewed in conjunction with the drawings and appended claims even though reference is made to the invention's use in the cell phone industry environment.

BRIEF DESCRIPTION OF THE DRAWINGS

Some of the objects and advantages of the present invention having been stated, others will become apparent as the description proceeds when taken in conjunction with the accompanying drawings, in which.

DETAILED DESCRIPTION

The following embodiments are described by way of a general application, which could be used for many such applications in various types of industries where electronic bills are available and where the industries have public billing plans and current market plan information available, but also a specific embodiment is shown for cell phone customers and cell phone provider billings based on the cell phone providers public rate plans and other information available. This invention is not limited to the cell phone industry only, but rather to all such applications where electronic bills can be made available and the billing companies publish rate plans and other information is available. Those skilled in the art will recognize and understand that these disclosed computer methods and systems will run on a computer and can be readily adaptable for broader application without departing from the concept of this invention.

The present invention now will be described more fully hereinafter with reference to the accompanying drawings in which a preferred embodiment of the invention is shown. This invention may, however, be embodied in many different forms and should not be construed as limited to the embodiment set forth herein; rather, this embodiment is provided so that this disclosure will be thorough and complete, and will convey a scope of the invention to those skilled in the art. Like numbers refer to like elements throughout.

Figure 1:
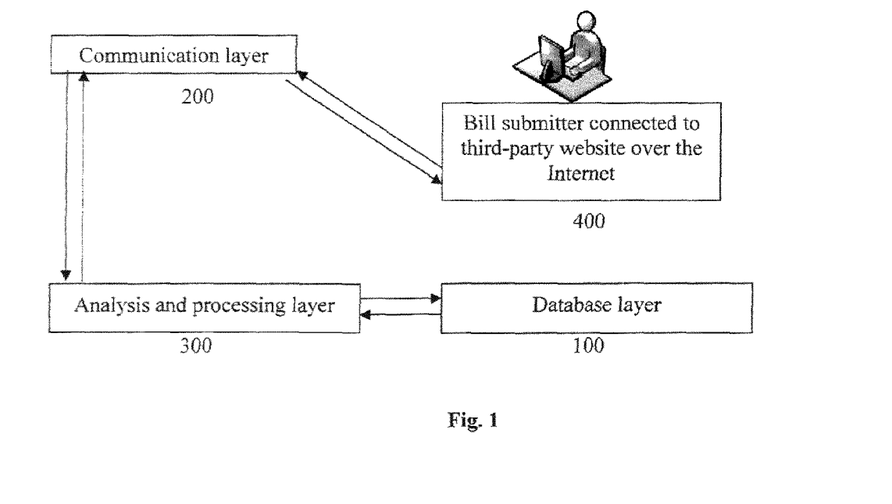
FIG. 1 is a diagrammatic outline of the overall architecture for the web-based auto bill analysis method.

The invention in its simplest form, at least in one embodiment as shown in FIG. 1, would have software architecture design layers which would include a database layer 100, analysis and process layer 300, and a communication layer 200 which would reside on a single computer server or on multiple computer servers connected together. The communication layer 200 supports and provides a webpage for the third-party provider of this invention to put up a public webpage from a server computer to allow public login by bill submitters 400 over the Internet for the purpose of submitting their bills for analysis. The communication layer 200 is in communication with the database layer 100 and analysis and process layer 300. The database layer 100, as shown in FIG. 1, is composed minimally, of at least, an error log 110, phone number call lookup log 120 or in an industry other than the cell phone industry a data reference resource and a data warehouse log 130. Before the invention can be made operational, the data warehouse log 130 which resides on the server computer must have loaded into it the public and current market plan information of multiple billing companies by each of the multiple billing companies. The loading of the public and current market plan information by each billing company for multiple billing companies is done by creating individual data fields and patterns from the loaded public and current market information by each billing company about billing companies that have their data loaded. Then the data fields and patterns created from the public and current market plan information on the server computer in data layer 100 are stored on the server computer. These data fields and patterns of the public and current market information for each billing company for multiple billing companies is broken down into individual data field and its related pattern shown in FIG. 3, by example only, which shows only a sampling of the type of detail data fields and related patterns to which the individual data and patterns must be broken into to be effective in the analysis of billing errors and utilization.

A bill submitter would go to the third-party website server system, which is available to analyze bills for errors and utilization, and receive an option to either submit a bill in electronic format from the billing company to third parties website system for analysis or either provides sufficient data, through the public webpage, to the server computer sufficient to allow the server computer to log into the billing company's computer to access the bill of the bill submitter for obtaining the bill desired to be analyzed. Once the bill submitter has selected one of the options, the bill submitter is provided from the communication layer 200 of the server computer a space for entry of identification and password to be associated with the bill which is being submitting. The server computer obtains the bill, through one of the options described above, and loads the bill in electronic format on the server computer over the Internet to the Data Warehouse log 130.

One of the first things that is done with the loaded bill is to analyze the bill submitted in electronic format to determine that the electronic format is in a text readable format which the server computer can use to analyze the bill. If it is not in such format, the server computer returns an error message through the communication layer 200 back to the bill submitter on the public webpage 400, while the bill submitter is logged on, to advise the bill submitter that it cannot accept the bill submitted. A text readable format, by way of example, could be a Public Document Format, known as a PDF format, or any other a document format which is in a text readable format which allows the server computer to read the text of the bill submitted. If the bill is in text readable format, the server computer reads the content of the bill into text in the memory of the Analysis and Processing layer 300 of the server computer and runs the text readable content in the memory to search for predetermined text for determining if the bill is from a billing company on which loaded public and current market information resides on the server computer in the data warehouse log 130. If the server computer does not find the predetermined text pattern for a company whose data is stored, it advises the bill submitter that it cannot accept the bill submitted by returning an error message to the communication layer 200 back to the bill submitter on the public webpage 400 while the bill submitter is still logged on.

Figure 2:
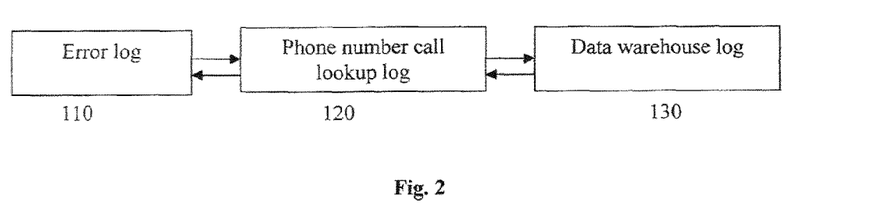
FIG. 2 is a diagrammatic outline of the components of the Database Layer of FIG. 1.

If the bill is accepted, the text content of the bill is stored in memory and a unique transaction identifier is assigned to the stored text which is stored in memory. Then a comparison is made of the stored text content in memory under unique transaction identifier against specific phrase patterns to determine if the stored text content matches associated individual data fields and patterns of the public and current market information loaded in the server computers memory in Data Warehouse Log 130 to prepare to extract text content. The text content that matches then has those values and terms extracted from the text content in memory which are matched with the data fields and patterns based on the loaded individual data fields and patterns of the public and current market plan information for a company whose bill is about to be analyzed. In the case of some companies, which have data outside their public and current market plan information, the extracted text data is run through a database to acquire additional data concerning extracted text data. In the case of cell phone companies, for example, the extracted text data of phone numbers is run through a Phone Number Call Lookup log 120 for determining data concerning each phone number and call necessary to determine the charges associated with each of the text data phone numbers extracted and the associated data with each phone number.

Once that step in the process has been completed a calculation of the data fields and patterns based on the text content extracted data fields and patterns of the submitted bill is run using said public and current market plan information data fields and patterns to determine the proper calculation of charges and usage on the bill submitted. Then the calculated values for the data fields and patterns are compared against the charges and usage data fields and patterns on the submitted bill to determine if the bill submitted is properly billed or improperly billed. A report is generated showing the results on the bill submitted and it is displayed through the communication layer 200 of the server computer to the public webpage 400 where the bill submitter is still logged on to receive the report. The bill submitter 400 is given an option of receiving the report through the communication layer 200 for correction of the bill submitted or authorizing third-party provider to submit the bill through the communication layer 200 server computer directly to the billing company for correction of the bill for said bill submitter. Correction of a bill by the report may include money correction, but also plan correction based the bill submitter's use of service as analyzed in the report. Even suggestions of a better plan with another service provider can be included in the report based on the analysis.

In addition to reporting errors in the bill submitted, a comparison can be made using calculated data fields and patterns based on preloaded data fields and patterns in said server computer against other like companies other than the company whose bill was submitted for analysis and based that comparison of the other companies who have public and current market information data stored in the server computer on the Data Log 130 recommend a better company to the bill submitter. In addition to the report submitted to the bill submitter on the errors and utilization of the bill submitted for analysis, the Analysis and Process Layer 300 transmit the errors and utilization report for the bill submitted to Error Log 110 for creating a collection summary of the errors by category and type of errors by each billing company for all billing companies whose public and current market information is loaded on the server computer for the purpose of generating an error and utilization reports for each billing company by each billing company for its collective errors and utilization for each of the billing companies for which public and current market information was loaded on the server computer. The collective summary is also used to generate by category and type of errors for each billing company by each billing company stored on the server computer for the purpose of updating and enhancing the accuracy of public and current market information on server computer for enhancing the analysis process for future analysis of billing errors and utilization by the server computer, thus providing accuracy enhancements to the analysis of billing errors and utilization to future calculations.

Figure 3:
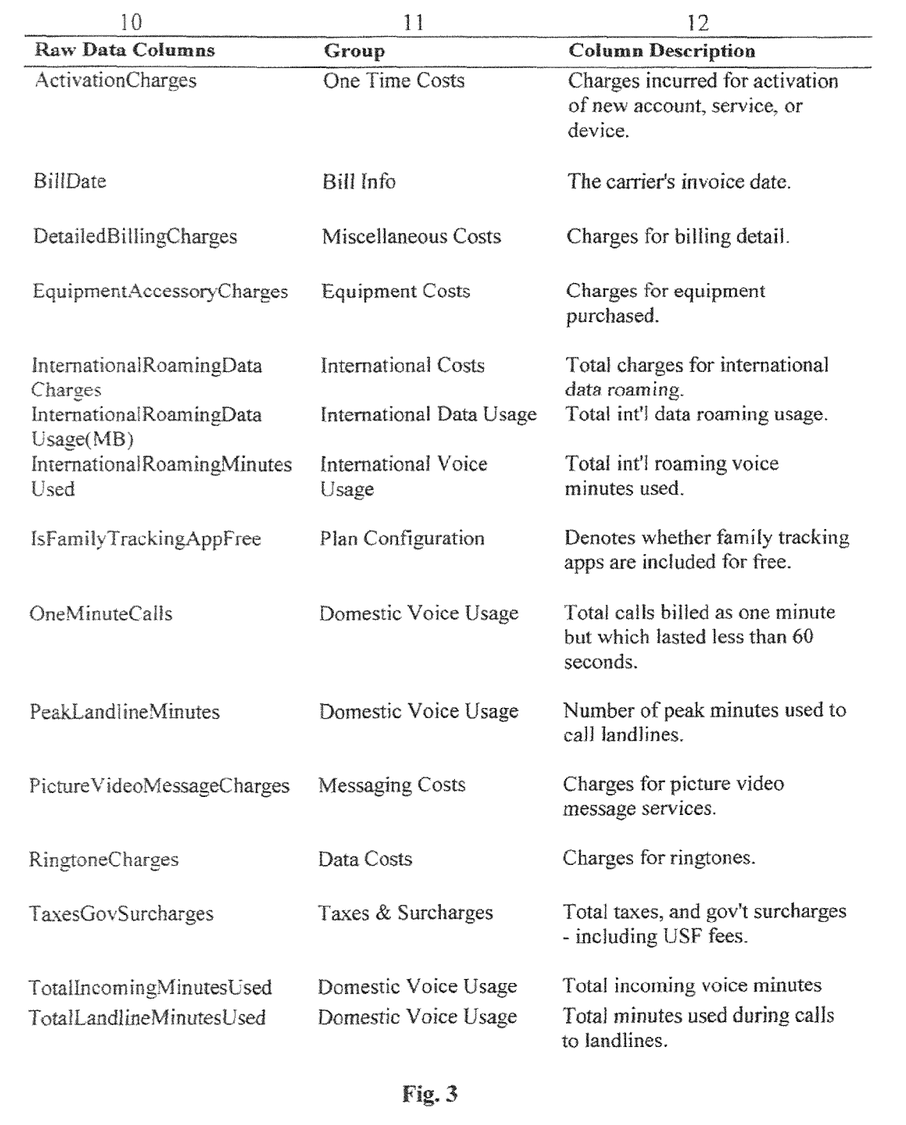
FIG. 3 is samples of data fields and patterns created when the public and current market plan information by each cell phone company is broken down and loaded/stored on a server computer.
Figure 4:
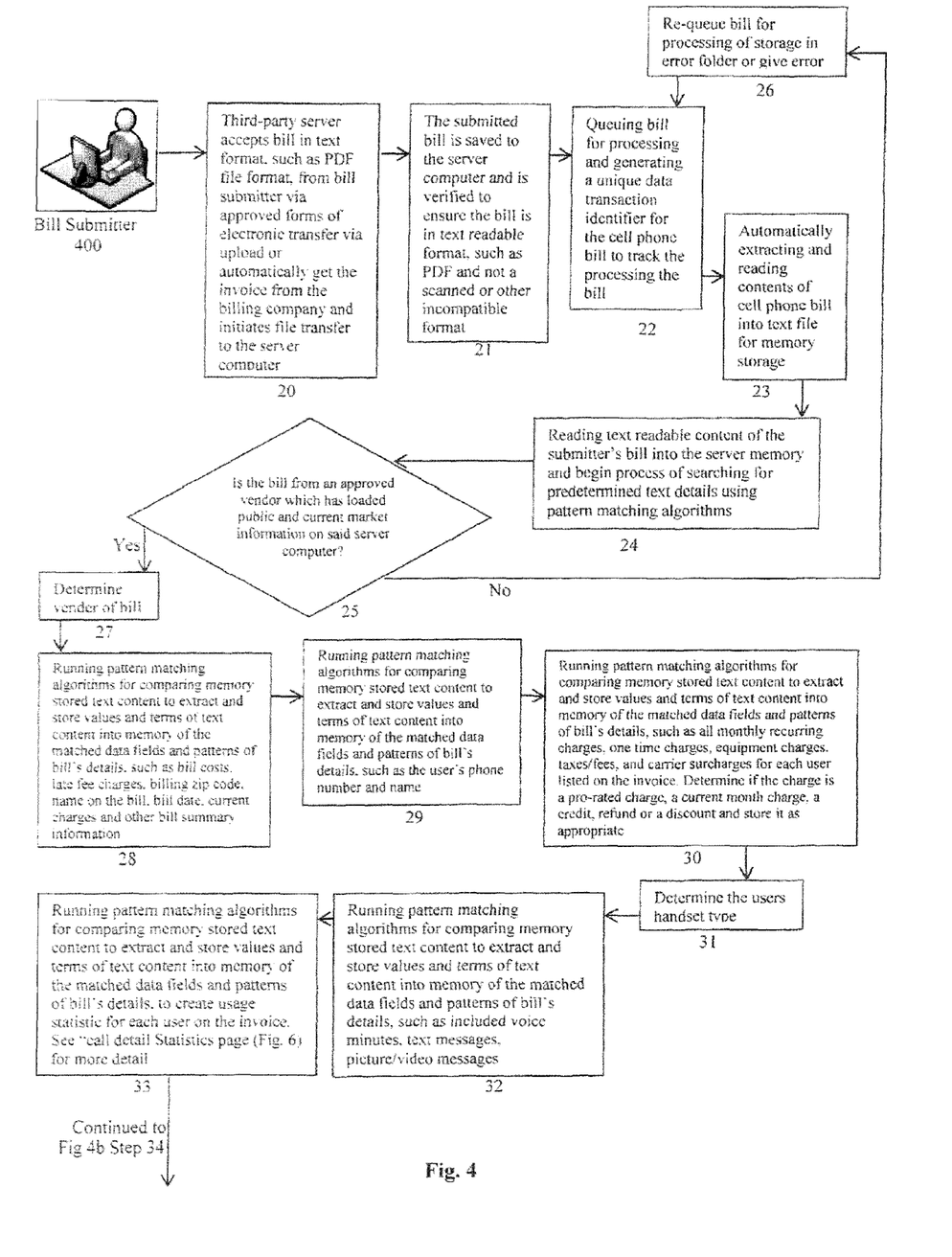
FIG. 4 is a diagrammatic general outline of the initial steps up to and through extracting text content and storing those values and terms into memory after having matched the data fields and patterns of a bill's details against the public and current market plan information by each cell phone company.
Figure 5:
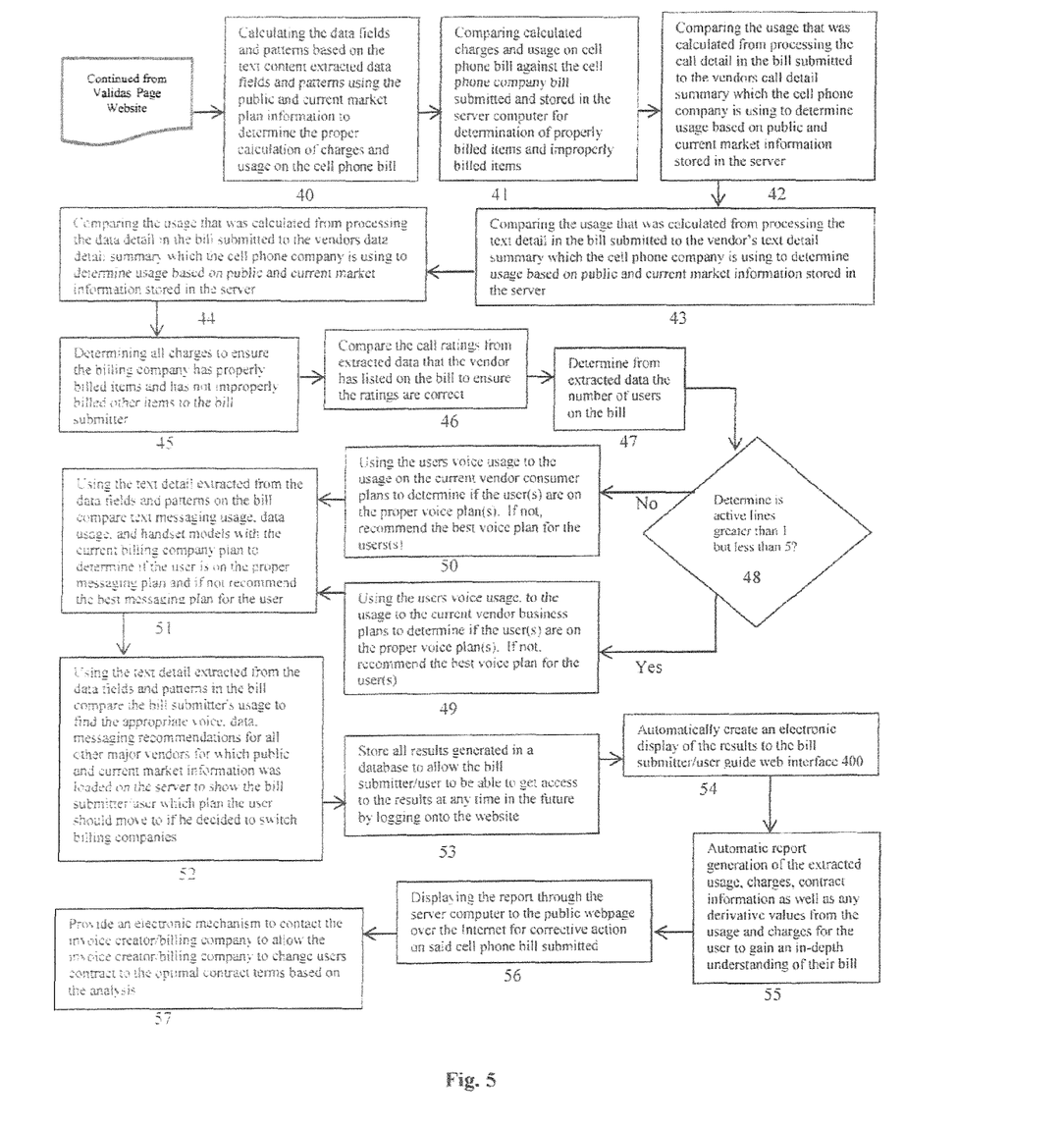
FIG. 5 is a diagrammatic general outline of the steps continued from FIG. 4 forward in the process of bill analysis including calculation of proper charges and usage and comparing those charges and usage on a cell phone to determine errors and utilization in the process of reporting such information.
Figure 6:
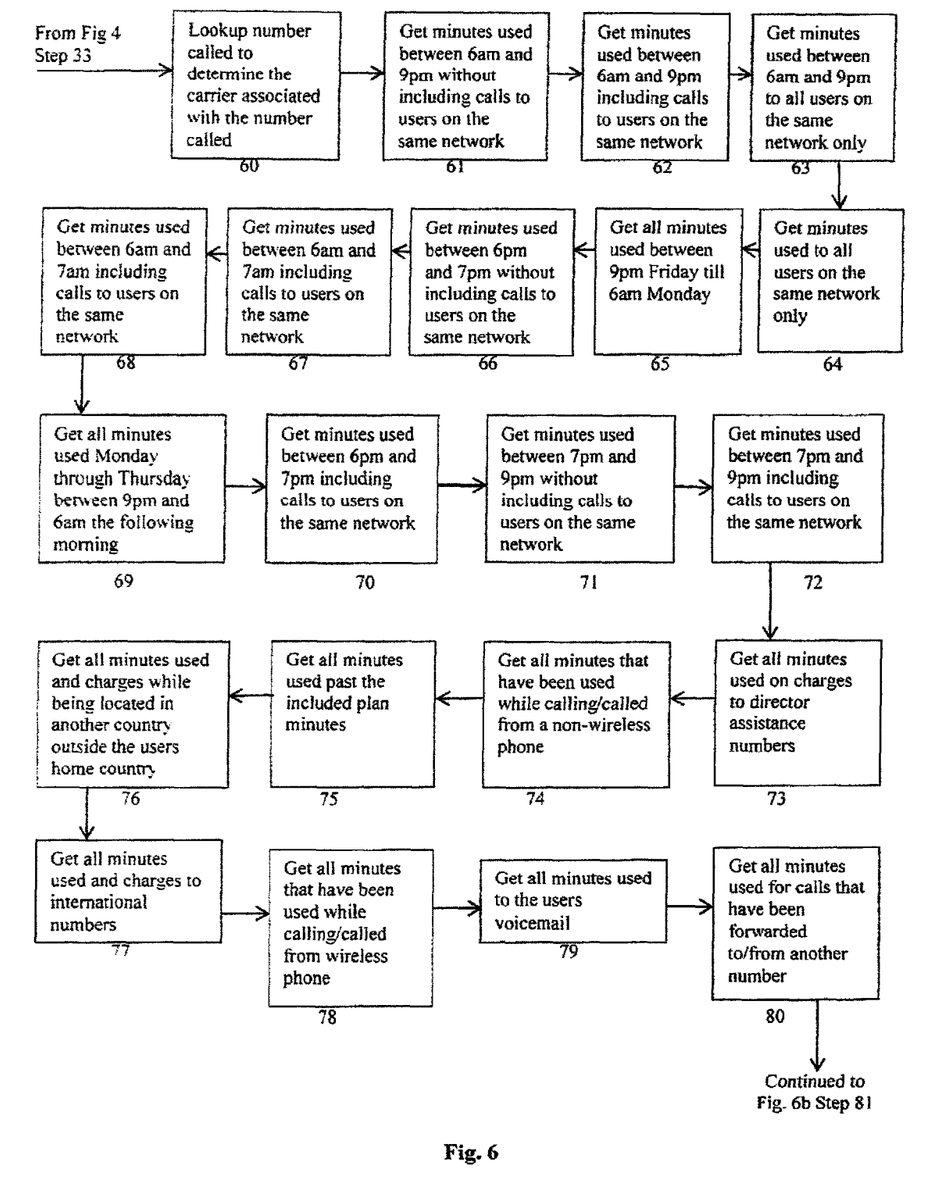
FIG. 6 is a diagrammatic general outline of the steps taken through a database and/or access point to a data base of "Phone Number Call Lookup Log" 130 shown in FIG. 2 which is accessed from step 33 in FIG. 4 to provide additional information necessary using the extracted data in text from the cell phone bill by going through the process shown in FIG. 6 and returning the results back to FIG. 4 at step 33 for continued processing of the cell phone bill.

While this invention can be applied to many industries, as those skilled in the art will understand, a more detailed description applied to a specific industry, such as the cell phone industry, may be further helpful to the understanding of this invention to those skilled in the art. Referring now to FIGS. 3, 4, 5, and 6 a more detailed description of one embodiment of this invention is described which is related to an embodiment or specific application for cell phone company customers and cell phone company providers. In this application cell phone users obtain a phone bill in electronic format from a cell phone service provider and submit it for analysis. FIGS. 4, 5, and 6 show the cell phone bill steps for analysis, but not the loading public and current market plan information for multiple cell phone companies into the third-party's computer servers. However FIG. 3 shows an example of the created individual data fields and patterns which are loaded from the public and current market plan information by each cell phone company for each multiple cell phone company and show an example of the data fields and patterns stored from the public and current market plan information on the server computer database layer 100.

FIG. 3 is only an example of a few individual data fields and patterns which are created from the hundreds of single items found in the Raw Data Columns 10 when the public and current market plan information by each cell phone company is broken down and loaded/stored in the data fields and patterns. The items in the Raw Data Columns 10 are then further categorized into the Group 11 which creates patterns into which the individual data items in the Raw Data Columns 10 are collected for meaningful relationships when analyzing a bill. The Description 12, in FIG. 3, provides a full description for each raw data item in Raw Data Columns 10 for control purposes and use in any reports produced. The Raw Data Column 10 would have numerical values, not shown in FIG. 3, which would be related to the individual data items for each cell phone company which has its public and current market plan information loaded on the third-party's server computer in the Data Log 100.

In these FIGS. 4, 5, and 6 the steps of loading public and current market plan information for multiple cell phone companies and creating individual data fields and patterns from the loaded public and current market plan information by each cell phone company for multiple cell phone companies storing the data fields and patterns created from the public and current market plan information on a server computer which is in communication with bill submitter 400, have already been taken. In FIG. 4, bill submitter 400 has already logged on to a public webpage provided by the third-party's server computer and has elected to obtain a copy of a cell phone bill, which was generated by a cell phone provider, to upload to the server computer instead of the option of providing data through the public webpage to the third-party's server computer sufficient to allow the server computer to log into the cell phone company's computers to access bill submitter's cell phone bill for obtaining a copy of bill submitter's cell phone bill. Cell phone bills obtained directly from a cell phone company may skip the steps of verifying who the cell phone provider company is, as that information was already given, but whether the cell phone bill provided is in a text readable format such as PDF will still be run for quality control.

In FIG. 4 bill submitter 400 transfers the bill obtained from the cell phone provider in the electronic text readable format, such as PDF, to the third-party's server computer in step 20. The bill submitter 400 would also have had the option of providing sufficient data through the public webpage to allow the third-party's server computer to log into the cell phone billing company's server computer to access the bill submitter's cell phone bill electronically for obtaining the cell phone bill directly and automatically at step 20 also. Once the submitted bill is received it is saved to the third-party's server computer, and verified to be sure the bill is in text readable format, such as PDF, and not a scanned or other incompatible format, at step 21. If the bill is not a readable text format bill, an error message not shown, is generated back through the server computer to the bill submitter 400 that the bill cannot be processed.

As a bill is saved and queued for processing, at step 22, a unique data transaction identifier is generated for cell phone bill to track the bill's processing through the third-party's server computer. This unique data transaction identifier, at step 22, is composed of data, for example only, which indicate the date of the bill, account number of the bill transmitter, bill submitter's name, and the billing company for allowing tracking of the bill by all identifiers or any combination of the data transaction identifiers to enhance the analysis of the bill.

After the bill has been queued and given the unique data transaction identifier, the content of the cell phone bill is extracted and read into a text file which is stored in the memory on the third-party's server computer, at step 23. Then the saved text file of the saved bill is read, at step 24, to begin the process of searching for predetermined text, data, details and patterns using pattern matching algorithms to determine that the bill is from a cell phone company on which loaded public and current market information resides on the third-party's server computer. If the bill, at step 25, is determined to be a text file from a cell phone company on which loaded public and current market information is stored on the third-party's server computer, a "Yes" signal is generated on the bill and it is passed to determine which of the cell phone companies is the generator of the cell phone bill at step 27. If the bill, at step 25, is determined not to be a text file from a cell phone company on which loaded public and current market information is stored on the third-party's server computer, a "No"

signal is generated on the bill and it is returned to be requeued at step 26 or sends an error message to the bill submitter 400, not shown.

Once the cell phone billing company has been identified, then a series of steps are commenced where a comparison of the stored text content of the cell phone bill is compared against specific phrase patterns to determine if the stored text content matches associated individual data fields and patterns of the public and current market plan information for the cell phone billing company loaded on the third parties computer server to prepare to extract the values and terms of the matched text content into memory in association with the matched data fields and patterns of the public and current market plan information for the cell phone company. The series of steps, by way of example only, starting at 28, extract the matched stored values and terms of text content into memory of the matched data fields and patterns on such items as bill's costs, late fee charges, billing zip code, name of the bill, bill date, current charges, and other bill summary information. Then continues with the series of steps 29 and 30 to perform the same extraction of stored values and terms of text into memory of the match data fields and patterns on such items, by example only and not limitation, such as users phone number and name, monthly reoccurring charges, one-time charges, equipment charges, taxes/fees, carrier sur-charges for each user listed on the bill and determine if charges are prorated, a current month charge, credit, refund or discount is appropriate. Then the handset type of the cell phone is determined by reading the text content of cell phone bill at step 31 and then the pattern matching for comparing matched stored text of the cell phone bill with the match data fields and patterns of cell phone company, at step 32 continues with items such as voice minutes, text messages, picture/video messages and other such information.

While much information is available from the text content extracted from memory on the bill about values and terms for the matched data fields and patterns exist, not all such information is available even after identifying phone numbers, which were both received and called on cell phone bill after the retrieval of stored text content, so step 33 is provided to utilize the extracted data for cell phone numbers called and received to create user statistics for each user on the bill and to then go through a Phone Number Call Lookup Data Log 120 to determine the missing data items necessary to calculate the bill as will be described in FIG. 6 and have that data supplied back to step 33 for continuation of the bill analysis for errors and utilization, before proceeding.

Continuing from step 33 is the running of the pattern matching algorithms for comparing stored text content to extract these stored values and terms of text content in the memory of the matched fields and data patterns for the cell phone company stored on said third-party's server computer by matching data fields and patterns of bills detail on such items as all domestic, international text and picture/video messaging usage and charges, at 34; such items as all domestic international data usage in charges, at 35; such items as the names and charges of any third-party downloads such as programs, music, games, ring tones, messages etc. at 36; and finally, at 37, such as international voice, or messaging usage and confirmation to see if the user had no usage at all, before proceeding to the analysis and utilization phase of the disclosed invention in FIG. 5.

The cell "Phone Number Call Lookup Log" 130 shown in FIG. 2 is a database and/or access point to a data base which can be accessed from step 33 in FIG. 4 to provide additional information which the cell phone bill submitted may not have, but which does have the data necessary to acquire this information through the Phone Number Call Lookup Log 130 using the extracted data in text from the cell phone bill by going through the process shown in FIG. 6. The first step in this process in FIG. 6 is to determine which called numbers belong to which associated carrier and which calls were placed with which carrier, at step 60. Then at step 61, the minutes used between 6 AM and 6 PM without including calls to users on the same network is obtained before getting the minutes used between 6 AM and 9 PM including calls to users on the same network at step 62 is processed. Then at step 63 the minutes used between 6 AM and 9 PM to all users on the same network only is obtained before getting the minutes used by all users on the same network only is obtained in step 64. Next, all minutes used between 9 PM Friday night till 6 AM Monday morning is obtained at step 65, before obtaining minutes used between 6 PM to 7 PM without including calls to users on the same network, at step 66. Then the process proceeds to get minutes used between 6 AM and 7 AM including calls to users on the same network at step 67, before minutes used between 6 AM and 9 PM without including calls to users on the same network is obtained at step 68. Next all the minutes used Monday through Thursday between 9 PM and 6 AM the following morning is obtained at step 69. The steps now proceed to get minutes use between 6 PM and 7 PM including calls to users on the same network at step 70 before getting minutes use between 7 PM and 9 PM without including calls to users on the same network at step 71. Then the step of getting minutes used between 7 PM and 9 PM including calls to users on the same network is performed at step 72 before the step of getting all minutes used and charges to directory assistance numbers is obtained at step 73. Now the process step moves to getting all minutes that have been used while calling/called from a non-wireless phone at step 74 is performed before obtaining all minutes used past the included plan minutes allowed at step 75 is actuated. Then the process moves to get all minutes used and charges while being located in another country outside the users home country is performed at step 76 before the process moves to get all minutes used and charges to national numbers is obtained at step 77. The process then moves to get all minutes that have been used while calling/called from wireless phones at step 78 before the process moves to get all minutes used to the users voice-mail at step 79 and it gets all minutes used for calls that have been forward to/from another number at step 80. Then a determination is made at step 81 as to how many minutes spanned multiple billing periods. Next a determination is made as to how many minutes lasted 1 min. or less at step 82 before moving to the determination of how many minutes were used by user calling other users between the hours of 6 AM and 9 PM during weekdays only is determined at step 83. Now a determination is made as to how many minutes were used by the user calling other users at step 84 before determining how many minutes were from other users calling the current user between the hours of 6 AM and 9 PM during weekdays only at step 85. Then a determination is made as to how many minutes were from other users calling the current user at step 86 before the number of minutes used between 7 AM and 7 PM without including calls to users on the same network is determined at step 87. Now the minutes used between 7 AM and 7 PM including calls to users on the same network is obtained at step 88 and then the total minutes used between 6 AM and 9 PM calling only the users listed on the invoice/bill is obtained at step 89. Next the total number of calls made by each user is obtained at step 90 and then the total number of minutes used is obtained at step 91. Finally, the top 15 numbers called between 6 AM and 9 PM based on the total minutes used during that time, is obtained at step 92 before the process returns back to step 33 as set out in FIG. 4. While the above steps have been set out as examples only, those skilled in the art would be aware that much more data can be derived from the database and cell phone bill and processed in different order than as set out above without departing from the invention.

Once all the data fields and patterns have been matched and extracted from the text and matched against the data fields and patterns of the publicly and current market information of cell phone providers, then calculations in FIG. 5 can be run with first step, at step 40 to determine the proper calculation of charges and usage on the cell phone bill using the extracted text and data fields and the information obtained from a external database, such as Phone Number Call Lookup Log 120. Once the calculations have been run, at step 40, then the steps of comparing calculated charges and usage on the cell phone bill against the text and data of the cell phone bill submitted can be commenced for determination of the properly billed and improperly billed items, at step 41. The step of comparing the calculated items using the call details of the bill submitted and extracted and read to memory can occur in a series of steps for collection of data by Groups 11 and a series of steps for comparing call details at step 42; text details at step 43 and data details at step 44 and then determine by comparison all charges entered by the billing company whether the billing company has properly billed items and improperly billed other items to the bill at step 45.

Now the process can be commenced of an analysis of usage for the cell phone bill by comparing call ratings from the extracted data, at step 46 to ensure the cell phone billing company has used the proper ratings on the cell phone bill. Also as the number of cell phone users can have an impact on the bill and the billing plan a determination must be made as to the number of users on the bill which can be made from the extracted data which was saved to memory on the third-party's server computer at step 47, and at step 48 a determination of active lines greater than one but less than five, for example is made. If the response is "Yes" then the process moves to step 49, but if the response is "No" in the process moves to step 50. In either case for step 49 and 50 the process proceeds to step 51 for comparison and analysis based on the criteria established for step 50 and step 51 to compare text messaging usage, data usage, handset models with current billing company plans to determine if user is on the proper messaging plan and if not recommend the best plan for the user, based on the cell phone companies public and current market plan information. A similar comparison is made at step 52 by comparing the extracted data fields and patterns of the bill submitter's bill against other cell phone billing companies with their public and current market information which is stored on the third parties server computer to compare items such is appropriate voice, data, messaging recommendations to show the bill submitter which plan he might move to if he decided to switch from one cell phone billing company to another. Once all the comparisons have been made, the results are generated in a database at step 53 to allow the bill submitter to be able to get access to the results of the bill analysis for errors and utilization at any time in the future by logging back onto the website through the communication layer 200 by way of bill submitter interface 400. This step is achieved by the third-party's server computer automatically creating an electronic display of the results to the bill submitter interface 400 at step 54 and providing it to the bill submitter while he is still online at that time. Also available to the bill submitter is an automatic report generation at step 55 for the generation of the extracted usage, charges, contact information as well as any derivative values from the usage and charges for the user to gain an in-depth understanding of their bills. This report from step 55 is displayed in step 56 through the third-party's interface 400 and can be submitted for corrective action to the cell phone company who generated the bill which was submitted. Finally at step 57, an electronic mechanism can be created to contact the invoice/billing cell phone billing company to allow the cell phone company to change user's contract to the optimal contract terms based on the analysis either has to errors or for utilization.

In the drawings and specification, there have been disclosed typical preferred embodiments of the invention and, although specific terms are employed, they are used in a generic and descriptive sense only and not for the purpose of limiting the scope of the invention being set forth in the following claims.

That claimed is:

1. A computer implemented method for real-time automatic analysis of a bill by a bill submitter over the internet on a third-party's server computer for errors and utilization using said bill generated by companies in an industry comprising;
   a. loading public and current market plan information for multiple companies in an industry by each of said companies on said third-party's server computer by individual data fields and patterns from said public and current market plan information by each company,
   b. presenting a public webpage from said third-party's server computer for public login by said bill submitter to login to obtain automatic analysis of said bill,
   c. providing space on said public webpage from said server computer for entry of identification, and password by said bill submitter,
   d. providing options on said public webpage from said third-party's server computer for said bill submitter to select an option to submit said bill obtained in electronic format from a billing company,
   e. analyzing said bill submitted in electronic format by said third-party's server computer to determine said electronic format is in text readable format,
   f. generating a unique transaction identifier for said bill,
   g. reading content of said bill in said text readable format into a text file to memory on said third-party's computer server,
   h. comparing said memory stored text file content of said bill under said unique transaction identifier in said third-party's computer server memory against specific data fields and patterns to determine if said stored text file content matches associated individual data fields and patterns of said public and current market plan information loaded in said third-party's server computer's memory to prepare to extract said text file content,
   i. extracting said values and terms of said text file into memory of said bill of said matched data fields and patterns based on said loaded individual data fields and patterns of said public and current market plan information in said memory,
   j. running said extracted values and terms through a look up database for determining data concerning each bill as to data necessary to determine the cost and charges associated with each of said values and terms,
   k. calculating the data fields and patterns based on said text file content of said bill extracted data fields and patterns using said public and current market plan information to determine the proper calculation of charges and usage on said bill, l. comparing said calculated charges and usage on said bill against said company bill submitted and stored in the server computer for determination of proper charges and usage, m. generating a report on said bill by said third-party's server computer, and n. displaying said report through said third-party's computer server to said public webpage over the internet for corrective action on said bill submitted.

2. The computer implemented method of claim 1 wherein providing said options on said public webpage from said server computer for said bill submitters to submit said bill obtained in electronic format from said billing company further comprises;

a. bill submitter obtaining a bill from a company in electronic format for submission through said public webpage to said third-party's server computer, or     b. bill submitter providing data through said public webpage to said third-party's server computer sufficient to allow said computer to log into said billing company's server computers to access said bill for obtaining said bill.

3. The computer implemented method of claim 2 further comprising;

a. running said text readable content in said memory of said third-party's server computer to search for predetermined text for determining said bill is from said company on which said loaded public and current market plan information resides on said third-party's server computer.

4. The computer implemented method of claim 3 further comprising;

a. comparing said calculated data fields and patterns based on preloaded data fields and patterns in said server computer against all said company public and current market information data stored on said third-party's server computer for determination of a recommendation of a company and billing plan for said bill submitter, and     b. displaying said report through said third-party's computer server over the internet to said website for said bill submitter.

5. The computer implemented method of claim 4 further comprising;

a. collecting a summary in memory from said generated report by categories and type errors by each billing company for all billing companies whose public and current market information are loaded on said third-party's server computer,     b. storing said collection summaries on said third-party's server computer for predetermined time, and     c. generating from said third-party's server computer error and utilization reports for each billing company by each billing company for collective errors and utilization's for each of said billing companies for which public and current market information was loaded on said third-party's server computer.

6. The computer implemented method of claim 5 further comprising;

a. adding said collection summaries generated by categories and type of errors for each billing company by each billing company which is stored on said server computer to said public and current market information analyzed for each of said billing companies, and     b. using said collection summaries generated by categories and type of errors for each billing company by each billing company stored on said third-party's server computer to update and enhance the accuracy of public and current market information on said third-party's server computer.

7. The computer implemented method of claim 6 further comprising;

a. paying by electronic payment through said server computer to said third-party company for said generated reports of errors and utilization, and     b. displaying from said third-party's server computer to said public webpage for said bill submitter said generated report for said errors and utilization of said bill submitted from said billing company while said bill submitter is logged on said third-party's server computer.

8. The computer implemented method of claim 7 further comprising;

a. submitting by said third-party's server computer said errors and utilization reports to said billing company for correction of said bill submitted.

9. The computer implemented method of claim 8 wherein generating a unique transaction identifier for said bill determined to be in text readable format further comprises;

a. a transaction identifier which identifies date of said bill, account number of bill transmitter, bill submitter's name, and said billing company for allowing tracking of said bill by all identifiers or by a combination there of.

10. A computer implemented method for real-time automatic analysis of a cell phone bill by a bill submitter over the internet on a third-party's server computer for errors and utilization using said cell phone bill generated by cell phone companies comprising;

a. loading public and current market plan information for multiple cell phone companies by each of said cell phone companies on said third-party's server computer by individual data fields and patterns from said public and current market plan information by each cell phone company,     b. presenting a public webpage from said third-party's server computer for public login by said bill submitter to login to obtain automatic analysis of said cell phone bill,     c. providing space on said public webpage from said server computer for entry of identification, and password by said bill submitter,     d. providing options on said public webpage from said third-party's server computer for said bill submitter to select an option to submit said cell phone bill obtained in electronic format from a cell phone billing company,     e. loading said cell phone bill in electronic format on said third-party's server computer over the internet,     f. analyzing said cell phone bill in electronic format by said third-party's server computer to determine said electronic format is in text readable format,     g. generating a unique transaction identifier for said cell phone bill,     h. reading contents of said cell phone bill in said text readable format into a text file to memory on said third-party's computer server,     i. comparing said memory stored text file content of said cell phone bill under said unique transaction identifier in said third-party's computer server memory against specific data fields and patterns to determine if said stored text file content matches associated individual data fields and patterns of said public and current market plan information loaded in said third-party's server computer's memory to prepare to extract said text file content,     j. extracting said values and terms of said text file content into memory of said cell phone bill of said matched data fields and patterns based on said loaded individual data fields and patterns of said public and current market plan information in said memory, k. running said extracted values and terms through a phone number call look up database for determining data concerning each phone number and call as to data necessary to determine the cost and charges associated with each of said phone number values and terms, l. calculating the data fields and patterns based on said text file content of said cell phone bill extracted data fields and patterns using said public and current market plan information to determine the proper calculation of charges and usage on said cell phone bill, m. comparing said calculated charges and usage on said cell phone bill against said cell phone company bill submitted and stored in the server computer for determination of proper charges and usage, n. generating a report on said cell phone bill by said third-party's server computer, and o. displaying said report through said third-party's computer server to said public webpage over the internet for corrective action on said cell phone bill submitted.

11. The computer implemented method of claim 10 wherein providing said options on said public webpage from said server computer for said bill submitters to submit said cell phone bill obtained in electronic format from said cell phone billing company further comprises;

a. bill submitter obtaining a cell phone bill from a cell phone company in electronic format for submission through said public webpage to said third-party's server computer, or b. bill submitter providing data through said public webpage to said third-party's server computer sufficient to allow said computer to log into said cell phone billing company's server computers to access said cell phone bill for obtaining said cell phone bill.

12. The computer implemented method of claim 11 further comprising;

a. running said text readable content in said memory of said third-party's server computer to search for predetermined text for determining said cell phone bill is from said cell phone company on which said loaded public and current market plan information resides on said third-party's server computer.

13. The computer implemented method of claim 12 further comprising;

a. comparing said calculated data fields and patterns based on preloaded data fields and patterns in said server computer against all said cell phone company public and current market information data stored on said third-party's server computer for determination of a recommendation of a cell phone company and billing plan for said bill submitter, and b. displaying said report through said third-party's computer server over the internet to said website for said bill submitter.

14. The computer implemented method of claim 13 further comprising;

a. collecting a summary in memory from said generated report by categories and type errors by each billing company for all billing companies whose public and current market information are loaded on said third-party's server computer, b. storing said collection summaries on said third-party's server computer for predetermined time, and c. generating from said third-party's server computer error and utilization reports for each billing company by each billing company for collective errors and utilization's for each of said billing companies for which public and current market information was loaded on said third-party's server computer.

15. The computer implemented method of claim 14 further comprising;

a. adding said collection summaries generated by categories and type of errors for each billing company by each billing company which is stored on said server computer to said public and current market information analyzed for each of said billing companies, and b. using said collection summaries generated by categories and type of errors for each billing company by each billing company stored on said third-party's server computer to update and enhance the accuracy of public and current market information on said third-party's server computer.

16. The computer implemented method of claim 15 further comprising;

a. paying by electronic payment through said server computer to said third-party company for said generated reports of errors and utilization, and b. displaying from said third-party's server computer to said public webpage for said bill submitter said generated report for said errors and utilization of said bill submitted from said billing company while said bill submitter is logged on said third-party's server computer.

17. The computer implemented method of claim 16 further comprising;

a. submitting by said third-party's server computer said errors and utilization reports to said billing company for correction of said bill submitted.

18. The computer implemented method of claim 17 wherein generating a unique transaction identifier for said cell phone bill determined to be in text readable format further comprises;

a transaction identifier which identifies date of said cell phone bill, account number of bill transmitter, bill submitter's name, and said cell phone billing company for allowing tracking of said cell phone bill by all identifiers or by a combination there of.

* * * * *